US005312517A

United States Patent [19]

Ouki

[11] Patent Number: 5,312,517

[45] Date of Patent: May 17, 1994

[54] METHOD OF FORMING A NOZZLE FOR AN INK-JET PRINTER HEAD

[75] Inventor: Yasuhiro Ouki, Nagano, Japan

[73] Assignee: Seiko Epson Corporation, Tokyo, Japan

[21] Appl. No.: 80,713

[22] Filed: Jun. 24, 1993

[30] Foreign Application Priority Data

| | | | |
|---|---|---|---|
| Jun. 24, 1992 | [JP] | Japan | 4-166041 |
| Jul. 21, 1992 | [JP] | Japan | 4-194107 |
| May 12, 1993 | [JP] | Japan | 5-134046 |

[51] Int. Cl.[5] .......................... B44C 1/22; B29C 37/00

[52] U.S. Cl. .................................... 156/643; 156/633; 156/644; 156/655; 156/668; 219/121.69; 427/155

[58] Field of Search ............... 156/633, 643, 644, 654, 156/655, 659.1, 668; 219/121.68, 121.69; 427/155

[56] References Cited

U.S. PATENT DOCUMENTS 3,668,028 6/1972 Short .............................. 156/644 X

FOREIGN PATENT DOCUMENTS 57-167765 10/1982 Japan .
60-183161 9/1985 Japan .
62-59047 3/1987 Japan .
63-122560 5/1988 Japan .
3207657 9/1991 Japan .

*Primary Examiner*—William Powell
*Attorney, Agent, or Firm*—Sughrue, Mion, Zinn, Macpeak & Seas

[57] ABSTRACT

A coating layer 5 made of a fluorine-containing polymer and having a thickness of 20 to 700 nm is formed on a surface of a nozzle forming member made of plastics which can be ablated by an excimer laser. Then, the nozzle forming member 1 is irradiated from its back by the excimer laser to generate high-density excited species in the irradiated portion. Using the force owing to the decomposition and scattering of the excited species, a nozzle 7 is formed and the coating layer 5 on the nozzle 7 is removed.

4 Claims, 3 Drawing Sheets

METHOD OF FORMING A NOZZLE FOR AN INK-JET PRINTER HEAD

BACKGROUND OF THE INVENTION

1. Field of the Invention

This invention relates to a method of forming a nozzle for an ink-jet printer head which ejects ink droplets to write records.

2. Prior Art

An ink-jet printer head ejects ink in the form of ink droplets from a nozzle to write records on a recording medium. In the case where water base ink is used as the ink, when the periphery of an opening of the nozzle has insufficient water repellency, the ink is liable to stick to the surface of the opening, thereby suffering a problem in that the straightforwardness of ink droplets is impaired.

It is generally understood that, with respect to the water repellency of the periphery of a nozzle opening, a contact angle of 90 degree or more does not cause the straightforwardness of ink droplets to be impaired. Accordingly, the surface of a nozzle opening is usually coated by a water repellent agent.

As the method of forming such a coating layer, there have been proposed various methods such as the electrostatic spray coating method (Japanese Patent Unexamined Publication (Kokai) No. SHO 57-167765), the vacuum deposition method (Japanese Patent Unexamined Publication (Kokai) No. SHO 60-183161), the dipping method, the spray coating method, and the spin coating method, etc. All of these methods have a drawback that a water repellent agent may enter a nozzle to clog it or to impair the straightforwardness of ink droplets, thereby adversely affecting the printing quality.

As a method of providing the water repellency to a surface of a nozzle opening without causing the nozzle to be clogged, Japanese Patent Unexamined Publication (Kokai) No. SHO 63-122560 discloses a method in which a flow path for ink is previously filled with a liquid or solid material and the coating process is then conducted, and Japanese Patent Unexamined Publication (Kokai) No. SHO 62-59047 discloses a method in which the coating process is conducted while ejecting air from a nozzle.

However, the former method has problems in that it is not easy to fill the flow path with a liquid or solid material and also that it is difficult to remove an excess of the filler material while keeping the flow path filled with the filler material. The latter method has a problem in that the periphery of the nozzle opening in which the water repellency must be exerted at the highest degree is affected by the air stream so as not to be sufficiently coated.

On the other hand, Japanese Patent Unexamined Publication (Kokai) No. HEI 3-207657 proposes a method in which an excimer laser is used as a nozzle forming means. This publication discloses also that, at the same time when a nozzle is formed, a water repellent layer formed on the periphery surface of the nozzle opening is removed by an excimer laser. Teflon may be used as a water repellent agent which can be removed by an excimer laser, but has a drawback that, when wiped, it is easily peeled off from the surface of the nozzle. A silicone resin cannot be superposed on a resin which can be ablated by an excimer laser. A silicone resin can be strongly bonded to glass. When glass is used as the material of the nozzle forming member, however, there arise problems in that it is difficult to form a nozzle and that glass dissolves in a long-term use.

SUMMARY OF THE INVENTION

The invention has been conducted in view of these problems, and has as an object the provision of a novel method of forming a nozzle for an ink-jet printer head which can form a water repellent layer that exhibits superior adhesion to a nozzle forming member and that is excellent in abrasion resistance, in an appropriate thickness and without allowing the material of the layer to enter the nozzle.

It is another object of the invention to provide a novel method of forming a nozzle for an ink-jet printer head which can form a thicker water repellent layer of a fluorine-containing polymer on a surface of a nozzle forming member.

In order to attain these objects, in the method of forming a nozzle for an ink-jet printer head according to the invention, a coating layer made of a fluorine-containing polymer is formed on a surface of a nozzle forming member made of plastics which can be ablated by an excimer laser, the coating layer having a thickness at which the coating layer can be completely removed from a nozzle by the ablation of the nozzle forming member and which is at least 20 nm, and the excimer laser is then irradiated in the direction from the back of the nozzle forming member to a nozzle formation portion.

In another method of forming a nozzle according to the invention, a coating layer made of a fluorine-containing polymer is formed on a surface of a nozzle forming member made of plastics which can be ablated by an excimer laser, the coating layer having a thickness at which at least a part of the coating layer can be removed from a nozzle by the ablation of the nozzle forming member and which is 20 nm or more, a covering layer is formed on the coating layer, the covering layer made of plastics which can be ablated by the excimer laser, the excimer laser is irradiated in the direction from the back of the nozzle forming member to a nozzle formation portion, and the covering layer is separated from the coating layer.

DETAILED DESCRIPTION OF THE PREFERRED EMBODIMENTS

Figure 1A:
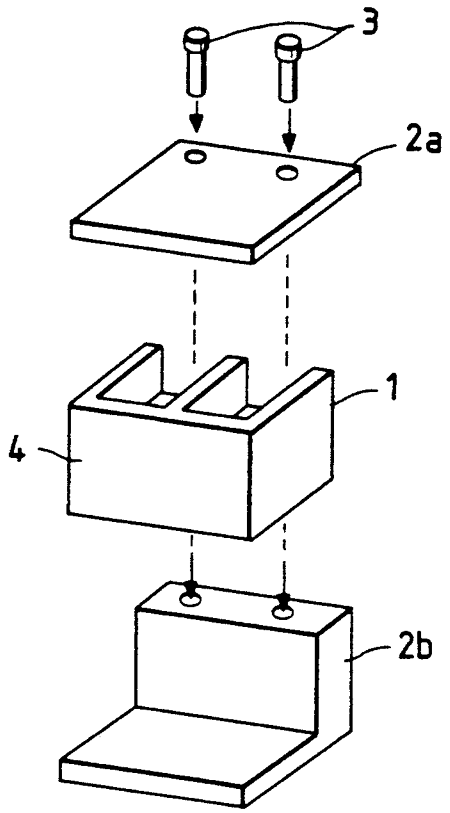
FIGS. 1(*a*) to 1(*d*) show a process of forming a nozzle for an ink-jet printer head according to an embodiment of the invention.
Figure 1C:
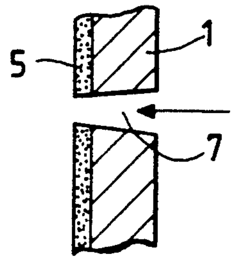
Figure 1D:
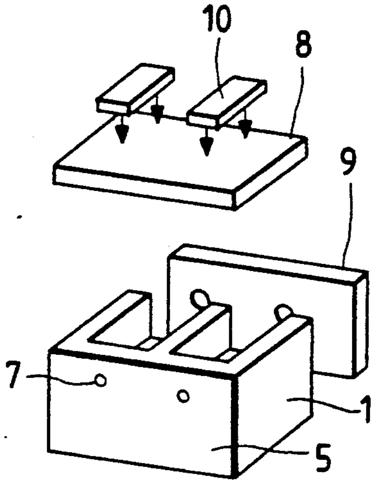
Figure 1B:
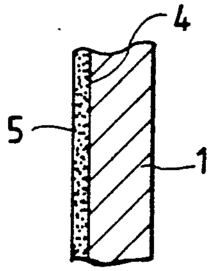
Figure 2:
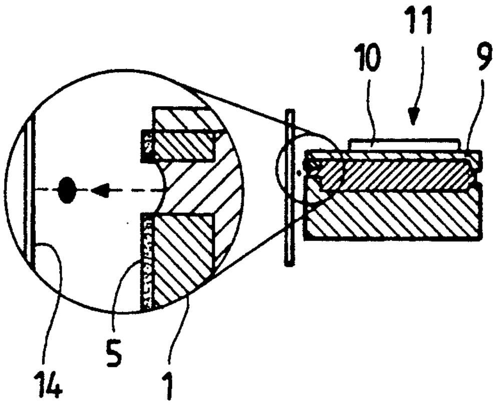
FIG. 2 is a diagram showing an ink ejection test of an ink-jet printer head formed by the forming process.

Embodiments of the invention will be described with reference to the accompanying drawings.

FIGS. 1(*a*) to 1(*d*) shows a process of forming a nozzle for an ink-jet printer head according to an embodiment of the invention.

First, an E-shaped nozzle forming member 1 is sandwiched by jigs 2*a* and 2*b* at the upper and lower sides of the member 1, and fixed thereto by screws 3 (FIG. 1(*a*)).

The nozzle forming member 1 is made of arbitrary plastics which can be ablated by an excimer laser, or plastics in which the photochemical reaction due to the irradiation of a strong UV laser produces high-density excited species in the irradiated portion and the etching is conducted by the force owing to the decomposition and scattering of the excited species. Specific examples of the plastics are polycarbonate, polysulfone, polyimide, polyether imide, polybenzimidazole, polyacetal, polyethylene, polyethylene terephtalate, polystylene, polyphenylene oxide, phenolic resins, acrylic resins, epoxy resins, and ABS resins.

Then, the surface 4 of the nozzle forming member 1 is immersed in a solution of a fluorine-containing polymer which functions as a water repellent agent and consists of 40 wt. % of SYTOP 105P (manufactured by Asahi Glass Company Ltd.) and 60 wt. % of CT-solv. 100 (manufactured by Asahi Glass Company Ltd.), and is allowed to stand for a while. Thereafter, the nozzle forming member 1 is pulled out of the solution at the rate of 100 mm/min. The nozzle forming member 1 is then heated at 120° C. in an oven for about one hour to evaporate the solvent, thereby forming a coating layer 5 having a thickness of 20 to 700 nm on the surface 4 (FIG. 1(*b*)).

The fluorine-containing polymer which is used as a water repellent agent is preferably an amorphous fluorine-containing polymer. In addition to the above-described compositions, specifically, useful examples of the fluorine-containing polymer include: a fluorine-containing polymer such as polydiperfuluoroalkylfumarate and Teflon AF (trademark of Du Pont); an alternating copolymer of fluorine-containing ethylene and hydrocarbon ethylene such as an alternating copolymer of diperfuluoroalkylfumarate and stylene, an alternating copolymer of ethylen chloride trifluoride and vinyl ether, and an alternating copolymer of ethylen chloride tetrafluoride and vinyl ester, their analogues and derivatives; and Fumalite (trademark of Nippon Oil and Fats Co., Ltd.).

These amorphous fluorine-containing polymers are soluble in a fluorinated organic solvent. When one of them is dissolved in a solvent at an arbitrary concentration and then coated on plastics which can be ablated by an excimer laser, therefore, a uniform coating having an excellent adhesion to the plastics can be obtained.

In addition to the above-described dipping method, examples of the coating method of an amorphous fluorine-containing polymer include the spray coating method in which a solution is sprayed, the spin coating method in which one or several droplets of a solution are allowed to fall on the surface of a nozzle forming member and then the member is rotated at a high speed to form a coating, and the transfer method in which a solution is previously applied on a supporter such as rubber and the supporter is then pressed against the surface of a nozzle forming member to form a coating.

Alternatively, the surface on which the coating is to be formed may be exposed to an atmosphere of ozone and then subjected to a coating process. This surface cleaning process using ozone can remove contamination from the surface so as to improve the adhesion of the coating layer. An atmosphere of ozone can be obtained by an oxygen plasma or irradiation of ultraviolet. In order to improve the adhesion to the surface on which the coating is to be formed, a layer of a coupling compound may be formed between the coating layer and the surface. This formation may be conducted singly or together with the surface cleaning process using ozone.

Thereafter, the nozzle forming member 1 is detached from the jigs 2*a* and 2*b*. A KrF excimer laser beam having an oscillation wavelength of 248 nm and an energy density of 2.0 $J/cm^2$ is irradiated to nozzle formation portions from the back 6 of the nozzle forming member 1, thereby forming a nozzle 7 at each of these portions.

This irradiation causes the portions of the nozzle forming member 1 irradiated by the excimer laser to be subjected to a photochemical reaction to produce high-density excited species. The excited species are decomposed and scattered to etch the portions so that the nozzles 7 are accurately formed at the portions as shown in FIG. 1(*c*). The coating layer 5 on the nozzles 7 is blown away by the decomposed and scattered excited species.

Figure 3:
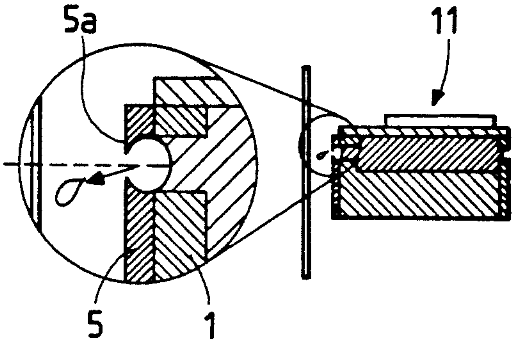
FIG. 3 is a diagram showing a state of a formed nozzle in which the coating layer has an excess thickness.
Figure 4A:
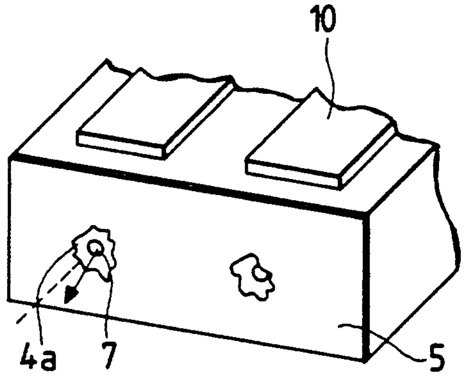
FIGS. 4(*a*) and 4(*b*) are diagrams showing a state of a formed nozzle in which the coating layer has an insufficient thickness.
Figure 4B:
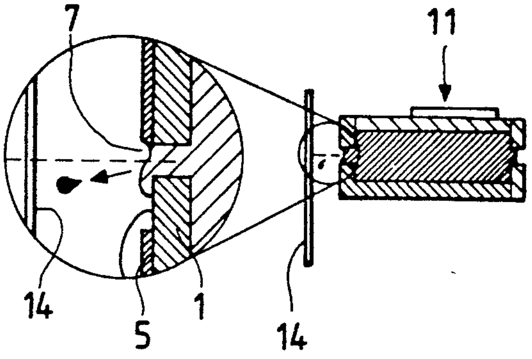
Figure 5A:
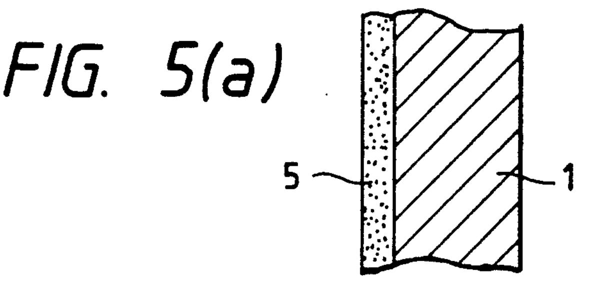
FIGS. 5(*a*) to 5(*d*) show another process of forming a nozzle for an ink-jet printer head according to the invention.
Figure 5B:
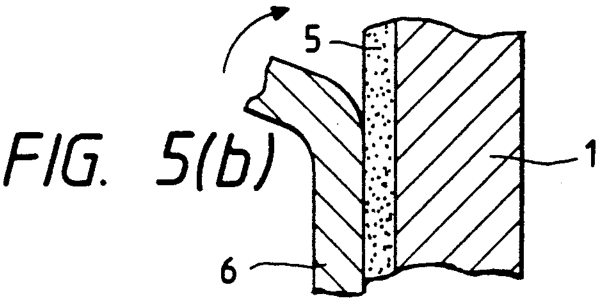
Figure 5C:
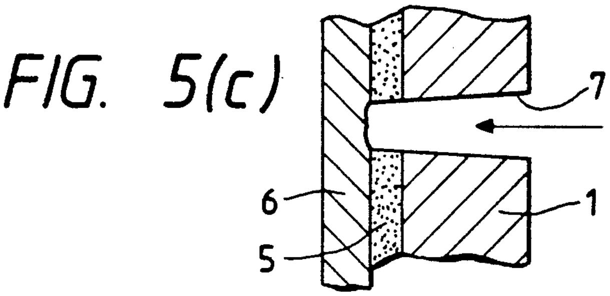
Figure 5D:
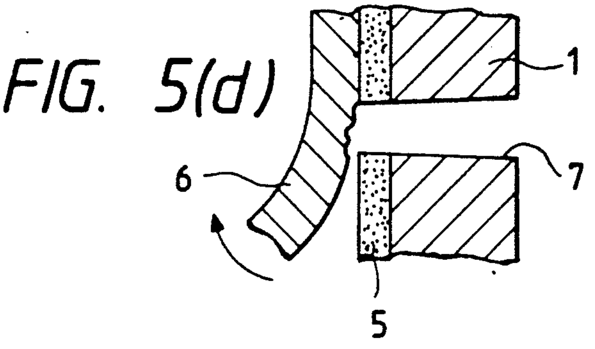

When the coating layer 5 has a thickness greater than 700 nm, the blow-off due to the excited species cannot be sufficiently performed with the result that a web-like film 5*a* is formed at the periphery of the opening of the nozzle 7 as shown in FIG. 3. When the coating layer 5 has a thickness less than 20 nm, also a portion of the coating layer 5 at the periphery of the nozzle 7 is blown away so that area 4*a* where no water repellent layer exists is formed as shown in FIG. 4.

Finally, a vibrating plate 8 for transmitting a pressure and a head formation part 9 having ink supply ports are adhered to the thus formed nozzle forming member 1 (FIG. 1(*d*)), and piezoelectric elements 10 are adhered to the vibrating plate 8, thereby constituting an ink-jet printer head 11.

The coating layer 5 made of a fluorine-containing polymer had a contact angle of 100 deg. or more with respect to water. There was no clogging of the nozzle 7 caused by the coating layer 5, and no failure in formation and shaping of the nozzle 7.

Embodiment 1

The thickness of the coating layer 5 formed by the dipping method described above was measured by a method in which the coating layer 5 was partly shaved off by a small piece of polysulfone and the level difference between the surface 4 exposed as a result of this shaving and the surface of the coating layer 5 was measured. The measurement showed that the thickness was about 300 nm. Using this head 11, ink 12 for the ink-jet printing and shown in Table 1 below was ejected from the nozzle 7. The ink was straightly ejected and flew without curving (0.5 deg. or less) and a high-quality recording image with a high printing accuracy was formed on a recording medium 14.

TABLE 1

| Components | Weight Ratio |
|---|---|
| Direct Black 154 | 3 wt. % |
| Glycerin | 5 wt. % |
| Ethanol | 5 wt. % |
| Proxel (manufactured by ICI) | 0.2 wt. % |
| Water purified by ion exchange | 86.8 wt. % |

The head was repeatedly wiped 5,000 times by a dust wiper made of silicone rubber. Even after this wiping test, the straightforwardness of ink droplets was not impaired and it was able to form a high-quality recording image with a high printing accuracy.

According to a dipping method using a solution functioning as a water repellent agent and consisting of 3.5 wt. % of AF1600 (manufactured by Du Pont) and 96.5 wt. % of FC-75 (manufactured by Sumitomo 3M Ltd.), a coating layer 5 having a thickness of about 850 nm was formed. Also in this case, excellent results similar to those mentioned above were obtained. Even after the wiping process of 10,000 times, the image quality was not changed According to this dipping method, a coating layer 5 having a thickness of about 800 nm was formed on a surface 4 of a nozzle forming member 1, and a nozzle was formed under the above-described conditions using an excimer laser In this case, as shown in FIG. 3, the coating layer 5 on the nozzle 7 was not sufficiently removed. When ink was ejected from the nozzle 7 of this head 11, ink droplets were affected by the coating layer 5 remaining in the form of a web-like film on the nozzle 7, to be curved by 2 to 8 deg., with the result that a high-quality recording image was not formed on a recording medium 14.

Embodiment 2

A surface 4 of a nozzle forming member 1 made of polycarbonate was irradiated for 10 minutes by UV light having a wavelength of 200 nm. Thereafter, one or several droplets of a solution of the composition listed in Table 2 below were allowed to fall on the surface, and the spin coating was conducted at 3,000 r.p.m. for one minute to coat the surface. The nozzle forming member 1 was heated at 80° C. for one hour to evaporate the solvent, thereby forming a coating layer 5 having water repellency on the surface 4.

TABLE 2

| Components | Weight Ratio |
|---|---|
| 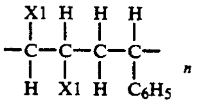 | 0.3 wt. % |
| FC-77 (manufactured by Sumitomo 3M Ltd.) | 99.7 wt. % |

The nozzle forming member 1 was irradiated from its back by a KrF excimer laser beam having an oscillation wavelength of 248 nm and an energy density of 2.0 J/cm$^2$, thereby forming a nozzle.

The coating layer 5 formed by the spin coating method had a contact angle of 100 deg. or more with respect to water. There was no clogging of the nozzle 7 caused by the coating layer 5.

The coating layer 5 formed by this method had a thickness of 30 nm. When ink was ejected from the nozzle 7 of the head 11, ink droplets were straightly ejected and flew without curving so that a high-quality recording image was formed on a recording medium 14.

The head was repeatedly wiped 2,000 times in the same manner as Embodiment 1. Even after this wiping test, it was able to form a high-quality recording image with a high printing accuracy.

According to this spin coating method, a coating layer 5 having a thickness of about 15 nm was formed on a surface of a nozzle forming member, and a nozzle was formed under the above-described conditions. In this case, as shown in FIG. 4(*a*), the portion of the coating layer 5 surrounding the nozzle 7 was broken. When ink was ejected from the nozzle 7 of this head 11, ink stuck to the surface 4 in the periphery of the nozzle 7. This caused the ink ejection direction to be curved by 3 to 5 deg., resulting in that a high-quality recording image was not formed.

As seen from the embodiments described above, it was confirmed that, when the coating layer 5 made of a fluorine-containing polymer and having a thickness of 20 to 700 nm is formed on the surface 4 of the nozzle forming member 1, the subsequent formation of the nozzle 7 using an excimer laser can form a nozzle which is free from ingress of the coating layer 5 and which have a sufficient coating in the periphery of its opening.

In the above embodiments, the nozzle forming member 1 itself utilizes the ablation. The ablation effect on the nozzle forming member 1 seems to be caused by the following process: The molecules constituting the irradiated portion are made unstable or enter the excited state or high energy state by the photochemical reaction due to the irradiation of an intense UV laser. Accompanying with this, in order that the excitation energy is diffused to stabilize the molecules, bonds of the molecules are broken to scatter the molecules. Even when an excimer laser having an energy density greater than the excitation energy is irradiated, therefore, the removal amount of a fluorine-containing polymer which is hard to excite cannot exceed a fixed level.

In the embodiments described above, accordingly, it is required to strictly control the upper limit of the film thickness so that the coating layer which is hard to excite is satisfactorily removed. In the embodiment described below, it is not required to conduct such a control and the film thickness can be increased, thereby further improving the abrasion resistance.

FIG. 5 shows the embodiment. On a surface of a nozzle forming member 1 made of polysulfone, firstly, a coating layer 5 made of a fluorine-containing polymer is formed by the same dipping method as that in the first embodiment (FIG. 5(*a*)). The thickness of the coating layer 5 is restricted to such a degree that at least a portion of the coating layer 5 on a nozzle 7 can be removed by the ablation of the nozzle forming member 1.

Then, onto the coating layer 5, a film having a thickness of about 100 μm and made of plastics such as polyimide which can be ablated by an excimer laser is attached as a covering layer 6 (FIG. 5(*b*)).

Thereafter, a KrF excimer laser beam having an oscillation wavelength of 248 nm and an energy density of 2.0 J/cm$^2$ is irradiated to a nozzle formation portion from the back of the nozzle forming member 1 on which the coating layer 5 and the covering layer 6 are formed. This irradiation causes the molecules of the irradiated portion to generate high-density excited species. The excited species are decomposed and scattered to etch the portion so that the nozzle 7 is accurately formed in the portion. The decomposed and scattered excited species partly remove the portion of the coating layer 5 covering the nozzle 7 as shown in FIG. 5(*c*). Furthermore, the portion of the covering layer 6 on the nozzle 7 is partly removed by the penetrating excimer laser, and the ablation of the covering layer 6 causes the portion of the coating layer 5 remaining on the nozzle 7 to be completely removed.

As shown in FIG. 5(*d*), finally, the covering layer 6 is peeled off from the upper face of the coating layer 5 to complete the nozzle formation process.

The coating layer 5 formed in the embodiment had a thickness of 2,000 nm. Using this head, ink was ejected from the nozzle 7. The ink was straightly ejected and flew without curving so that a recording image with a high printing accuracy was formed on a recording medium 14.

A nozzle 7 was formed by irradiating an excimer laser from the back of the nozzle forming member 1 on which the coating layer 5 having the thickness of 2,000 nm was formed but the covering layer 6 was not attached onto the layer. The coating layer 5 on the nozzle 7 was not completely removed. This caused ink to be curved by 2 to 8 deg., resulting in that a high-quality recording image was not formed.

From the above, it was confirmed that the coating layer 5 on the nozzle 7 can be removed not only by the ablation of the nozzle forming member 1 but also by the ablation of the covering layer 6.

Embodiment 3

On a surface 4 of a nozzle forming member 4 made of polyether imide, a coating layer 5 having a thickness of 800 nm was formed by the same spin coating method as that of the second embodiment. A covering layer 6 made of polyethylene terephtalate and having a thickness of 150 μm was attached onto the coating layer.

Then, an excimer laser was irradiated from the back of the nozzle forming member 1 so as to conduct the same nozzle formation process as that described above, with the result that a head from which ink droplets can be ejected without curving was formed.

A film of polytetrafluoroethylen which had a thickness of 500 μm and cannot be ablated by an excimer laser was attached onto a coating layer 5 that had the same thickness as that of the above-mentioned coating layer. Then, the same nozzle formation process as the process described above was conducted. As a result, the coating layer 5 on a nozzle 7 was not completely removed. This caused the ejection direction of ink to be bent.

From the above, it was confirmed that the covering layer 6 attached onto the coating layer 5 must be a film made of a material which can be ablated by an excimer laser.

Effects of the Invention

As described above, according to the invention, a coating layer made of a fluorine-containing polymer is formed on a surface of a nozzle forming member made of plastics which can be ablated by an excimer laser, and the excimer laser is then irradiated from the back of the nozzle forming member. At the same time of the formation of a nozzle by an excimer laser, therefore, the fluorine-containing polymer which has an excellent abrasion resistance and is hard to be excited can be completely removed from the nozzle by utilizing the force owing to the decomposition and scattering of excited species generated during the nozzle formation, so that a coating layer that does not cause ink droplets to curve in the flying can be easily formed on the nozzle forming member.

Alternatively, after a covering layer made plastics which can be ablated by an excimer laser is formed on a coating layer, the excimer laser is irradiated from the back of a nozzle forming member. Accordingly, even when the coating layer made of a fluorine-containing polymer is formed so as to have a sufficient thickness, the provision of the nozzle forming member and the covering layer can allow the coating layer to be surely removed.

What is claimed is:

1. A method of forming a nozzle for an ink-jet printer head, comprising the steps of:

preparing a nozzle forming member made of plastics which can be ablated by an excimer laser;

forming a coating layer made of a fluorine-containing polymer on a surface of said nozzle forming member made, said coating layer having a thickness at which said coating layer can be completely removed from a nozzle by the ablation of said nozzle forming member and which is at least 20 nm; and forming a nozzle by irradiating the excimer laser in a direction from a back of said nozzle forming member to a nozzle formation portion.

2. A method of forming a nozzle for an ink-jet printer head according to claim 1, wherein a material of said coating layer is an amorphous fluorine-containing polymer.

3. A method of forming a nozzle for an ink-jet printer head according to claim 1, wherein said coating layer has a thickness of 20 to 700 nm.

4. A method of forming a nozzle for an ink-jet printer head, comprising the steps of:

preparing a nozzle forming member made of plastics which can be ablated by an excimer laser;

forming a coating layer made of a fluorine-containing polymer on a surface of said nozzle forming member, said coating layer having a thickness at which at least a part of said coating layer can be removed from a nozzle by the ablation of said nozzle forming member and which is 20 nm or more;

forming a cover layer on said coating layer, said covering layer made of plastics which can be ablated by the excimer laser;

forming a nozzle by irradiating the excimer laser in a direction from a back of said nozzle forming member to a nozzle formation portion; and after said nozzle formation step, separating said covering layer from said coating layer.

* * * * *